(12) United States Patent
Herbin

(10) Patent No.: US 9,909,732 B2
(45) Date of Patent: Mar. 6, 2018

(54) LIGHTING OR INDICATING DEVICE FOR A MOTOR VEHICLE AND CORRESPONDING ASSEMBLY METHOD

(71) Applicant: Valeo Vision Belgique, Meslin l'Eveque (BE)

(72) Inventor: Cyril Herbin, Potelle (FR)

(73) Assignee: VALEO VISION BELGIQUE, Meslin l'Eveque (BE)

( * ) Notice: Subject to any disclaimer, the term of this patent is extended or adjusted under 35 U.S.C. 154(b) by 28 days.

(21) Appl. No.: 15/027,315

(22) PCT Filed: Oct. 10, 2014

(86) PCT No.: PCT/EP2014/071797
§ 371 (c)(1),
(2) Date: Apr. 5, 2016

(87) PCT Pub. No.: WO2015/052324
PCT Pub. Date: Apr. 16, 2015

(65) Prior Publication Data
US 2016/0238211 A1 Aug. 18, 2016

(30) Foreign Application Priority Data
Oct. 11, 2013 (FR) ..................... 13 59923

(51) Int. Cl.
*F21V 1/00* (2006.01)
*F21S 8/10* (2006.01)
*B60Q 1/26* (2006.01)

(52) U.S. Cl.
CPC .......... *F21S 48/212* (2013.01); *B60Q 1/2638* (2013.01); *B60Q 1/2696* (2013.01);
(Continued)

(58) Field of Classification Search
CPC ...... F21S 48/212; F21S 48/211; F21S 48/215; F21S 48/2206; F21S 48/232; F21S 48/236; F21S 48/24; B60Q 1/2638; B60Q 1/2696
See application file for complete search history.

(56) References Cited

U.S. PATENT DOCUMENTS 4,914,731 A * 4/1990 Chen .................... G09F 9/33
257/E25.02
5,388,035 A * 2/1995 Bodem, Jr. .......... B60Q 1/2696
362/240
(Continued)

FOREIGN PATENT DOCUMENTS

DE 202006018081 2/2007
EP 2713098 4/2014
(Continued)

*Primary Examiner* — Alexander Garlen
(74) *Attorney, Agent, or Firm* — Oblon, McClelland, Maier & Neustadt, L.L.P.

(57) ABSTRACT

A lighting or indicating device for motor vehicles comprises an enclosure formed by a housing and an outer lens, the enclosure receiving a printed circuit carrying at least one light source and an optical device. The housing comprises means for fastening the stack formed by the printed circuit and the optical device, so as to fix together the housing, the printed circuit carrying at least one light source and the optical device, the printed circuits being sandwiched between the housing and the optical device.

13 Claims, 5 Drawing Sheets

(52) U.S. Cl.
CPC ........... *F21S 48/211* (2013.01); *F21S 48/215* (2013.01); *F21S 48/2206* (2013.01); *F21S 48/232* (2013.01); *F21S 48/236* (2013.01); *F21S 48/24* (2013.01)

(56) References Cited

U.S. PATENT DOCUMENTS

| | | | |
|---|---|---|---|
| 5,746,497 A * | 5/1998 | Machida | B60Q 1/2696 340/479 |
| 7,307,391 B2 | 12/2007 | Shan | |
| 8,303,148 B2 | 11/2012 | Frey et al. | |
| 8,348,461 B2 | 1/2013 | Wilcox et al. | |
| 8,888,323 B2 | 11/2014 | Alfier et al. | |
| 2004/0136203 A1 * | 7/2004 | Gasquet | B60Q 1/2607 362/543 |
| 2005/0169002 A1 * | 8/2005 | Steen | B60Q 1/302 362/487 |
| 2007/0183156 A1 | 8/2007 | Shan | |
| 2010/0067248 A1 | 3/2010 | Frey et al. | |
| 2011/0085329 A1 * | 4/2011 | Kuo | F21V 5/007 362/235 |
| 2011/0103051 A1 | 5/2011 | Wilcox et al. | |
| 2012/0113659 A1 * | 5/2012 | Hermitte | F21S 48/155 362/487 |
| 2014/0085887 A1 | 3/2014 | Alfier et al. | |

FOREIGN PATENT DOCUMENTS

| | | |
|---|---|---|
| FR | 2952164 | 5/2011 |
| WO | 2011053349 | 5/2011 |
| WO | 2013079242 | 6/2013 |

* cited by examiner

LIGHTING OR INDICATING DEVICE FOR A MOTOR VEHICLE AND CORRESPONDING ASSEMBLY METHOD

CROSS-REFERENCE TO RELATED APPLICATIONS

This application is the U.S. National Phase application of PCT Application No. PCT/EP2014/071797 filed Oct. 10, 2014, which claims priority to the French application 1359923 filed Oct. 11, 2013, which applications are incorporated herein by reference and made a part hereof.

BACKGROUND OF THE INVENTION

1. Field of the Invention

The invention relates to a lighting or indicating device for a motor vehicle.

The invention also relates to a method for assembling a lighting or indicating device for a motor vehicle.

2. Description of the Related Art

There are known lighting or indicating devices for motor vehicles which comprise an enclosure formed by a housing and an outer lens, intended to receive a reflector and a light source mounted on a support. For the assembly of a lighting or indicating device of this type, the usual procedure is to position and fasten the support in the housing, notably by screwing, and then to position and fasten the reflector onto the support or onto the housing, notably by screwing. Finally, the outer lens is positioned and fastened onto the housing. The operations of fastening the support in the housing and fastening the reflector to the support or to the housing create complexity, and therefore give rise to costs, particularly where screwing operations are used.

The document FR 2 952 164 A1 proposes a lighting and/or indicating device designed to reduce the complexity and cost of production of lighting or indicating devices for motor vehicles.

The lighting and/or indicating device for motor vehicles according to FR 2 952 164 A1 comprises an enclosure formed by a housing and an outer lens, receiving a support supporting at least one light source and a reflector. The housing and the outer lens have, respectively, a first means for support on the support or on the reflector or on the support and reflector assembly, and a second means for support on the support or on the reflector or on the support and reflector assembly. The support means enable the support or the reflector or the support and reflector assembly to be immobilized in at least one direction, and may also enable a mechanical force, such as a bending force, to be applied to impart a stress to the support or the reflector or the support and reflector assembly. A method according to FR 2 952 164 A1 for assembling a lighting and/or indicating device comprises the following steps:

positioning on the housing:
the support, or
the support and the reflector,
without fixing either the support or the reflector to the housing,
assembling the outer lens onto the housing, for example by gluing and/or clipping and/or welding.

No step of fastening the support in the housing, and notably no step of fastening by screwing, is required in the method of FR 2 952 164 A1.

SUMMARY OF THE INVENTION

One object of the invention is to provide a novel lighting or indicating device having a smaller number of parts, assembled by stacking without the use of screws.

Another object of the invention is to provide a novel method for assembling a lighting or indicating device, making it possible to reduce costs and facilitate assembly without the use of screws, while still providing a high degree of precision in the assembled device.

The invention proposes a lighting or indicating device for a motor vehicle, comprising an enclosure formed by a housing and an outer lens, the enclosure receiving a printed circuit carrying at least one light source and an optical device, wherein the housing comprises means for fastening the stack formed by the printed circuit carrying at least one light source and the optical device, so as to fix together the housing, the printed circuit carrying at least one light source and the optical device, the printed circuit carrying at least one light source being sandwiched between the housing and the optical device.

This device is simpler to produce, since a number of parts can be mounted at the same time. Additionally, it allows more precise adjustment of the light source relative to the optical device. This is even more useful when the source is a light-emitting diode, also called an LED.

According to other, alternative, characteristics of the invention:

the housing comprises means for positioning the printed circuit, and the printed circuit comprises means for positioning the optical device.

the housing comprises a centering means forming a flat region, coming into contact with a lower face of the outer lens or cover, and surrounding the printed circuit and the optical device assembled to the housing by stacking.

the housing and the outer lens or cover are fastened to one another without screws and in a sealed manner by a continuous assembly bead connecting two regions, preventing the assembled printed circuit and optical device from being subjected to a pressure stress caused by the outer lens.

the means for fastening the stack formed by the printed circuit carrying at least one light source and the optical device to the housing are subjected to deformation at their projecting ends, for the purpose of fastening the stack formed by the printed circuit and the optical device to the housing.

the deformation of the projecting ends of the fastening means for fastening the stack formed by the printed circuit and the optical device to the housing comprises a hot riveting or swaging operation to form a mushroom head.

the printed circuit comprises passage means through which the fastening means pass.

the optical device comprises passage means through which the fastening means pass.

the means pass through the passage means of the printed circuit and then through the passage means of the optical device, so that each of the fastening means has a projecting end extending beyond the optical device, these projecting ends having a deformation for fastening the stack formed by the printed circuit and optical device to the housing.

the passage means of the printed circuit and/or the passage means of the optical device are holes.

the means for fastening the stack formed by the printed circuit carrying at least one light source and the optical device to the housing comprise pins or studs extending from a support surface of the housing receiving and supporting a lower face of the printed circuit.

the light source may comprise at least one light-emitting diode.

the means for fastening the stack formed by the printed circuit carrying at least one light source and the optical device to the housing comprise pins or studs extending from a support surface of the housing receiving and supporting a lower face of the printed circuit.

the optical device comprises at least one collimator; it may comprise a plurality of collimators.

each collimator faces a single light source, and essentially receives light only from this source, which is thus associated with it.

the collimator is a transparent optical part designed to allow the passage of the light of the source associated with it; advantageously, the collimator is arranged to distribute the light rays according to a given photometry: for example, the optical device can be used, because of its collimator or collimators, to generate an indicating beam of the daytime position light type (also called "DRL").

the optical device comprises a plurality of collimators and is made in one piece; for example, the one-piece material has portions shaped as collimators and portions connecting these collimators.

The invention also proposes a method for assembling a lighting or indicating device for a motor vehicle, comprising an enclosure formed by a housing and an outer lens according to the invention, comprising the following steps:

a first step of providing the housing, a second step of providing the printed circuit, and a third step of placing and positioning the printed circuit in the housing without fastening the printed circuit in the housing; a fourth step of providing the optical device and a fifth step of placing and positioning the optical device on the printed circuit;

wherein the fifth step comprises an operation of finally fixing the assembly of the housing, the printed circuit, and the optical device, with the printed circuit carrying at least one light source sandwiched between the housing and the optical device.

According to other, alternative, characteristics of the invention:

the operation of finally fixing the assembly of the housing, the printed circuit, and the optical device comprises the deformation of the projecting ends of fastening means extending from a support surface of the housing.

the method comprises a step of assembling the outer lens to the housing, executed without the transmission of stress or deformation to the printed circuit or to the optical device.

the light source comprises at least one light-emitting diode.

These and other objects and advantages of the invention will be apparent from the following description, the accompanying drawings and the appended claims.

BRIEF DESCRIPTION OF THE ACCOMPANYING DRAWINGS

The invention will be more clearly understood from the following description which is provided by way of non-limiting example, with reference to the attached drawings, in which.

DETAILED DESCRIPTION OF THE PREFERRED EMBODIMENTS

With reference to FIGS. 1 to 8, identical or functionally equivalent elements are indicated by identical reference numbers.

Figure 1:
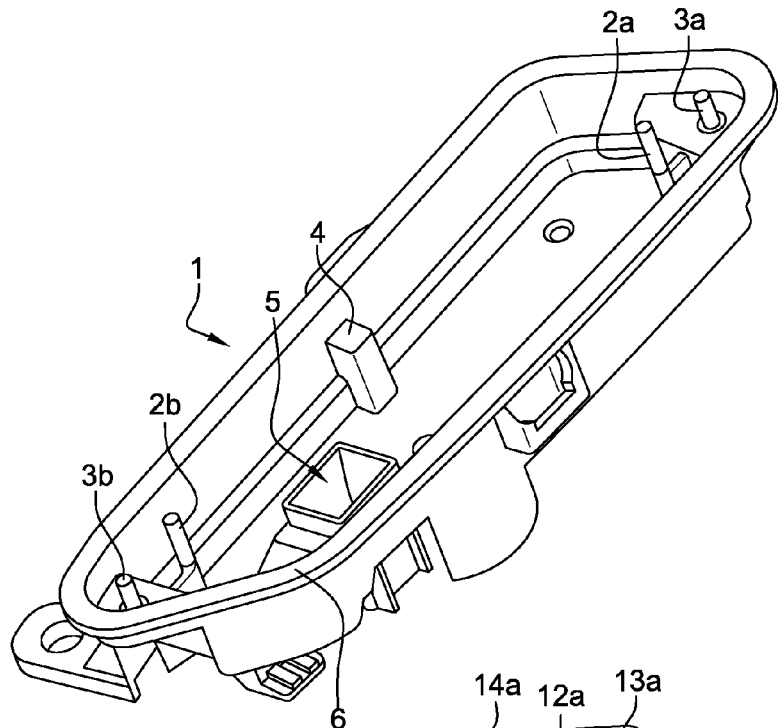
FIG. 1 shows schematically a perspective view of a housing of a lighting or indicating device according to the invention.

In FIG. 1, a preferred embodiment of a lighting or indicating device for a motor vehicle comprises a housing 1.

The lighting or indicating device in this exemplary embodiment is a daytime indicating device using light-emitting diodes.

The housing 1 is preferably made of plastic material by molding.

The housing 1 comprises a first means 2a for positioning a printed circuit 7 (FIG. 2), notably by means of an interacting shaped part of the printed circuit 7.

The housing 1 comprises a second means 2b for positioning the printed circuit 7, notably by means of an interacting shaped part of the printed circuit 7.

The positioning means 2a, 2b comprise, for example, pins or studs, notably pins extending from the bottom of the housing 1.

The housing 1 comprises a first means 3a for fastening a stack formed by a printed circuit and an optical device to the housing 1.

The housing 1 comprises a second means 3b for fastening a stack formed by the printed circuit 7 and an optical device to the housing 1.

The fastening means 3a, 3b comprise, for example, pins or studs, notably pins extending from a support surface of the housing 1 intended to receive and support a lower face of the printed circuit 7.

The housing 1 comprises a printed circuit stop means 4, notably designed to come into contact with a lower face of the printed circuit 7.

The housing 1 comprises means 5 for mounting a connector or electrical interface which is not shown, and which is, notably, designed to connect the printed circuit 7 electrically to a control means of a motor vehicle for which the device according to the invention is intended.

The housing 1 also comprises a centering means 6 forming a flat region, notably designed to come into contact with a lower face 24 (FIG. 6) of a transparent or translucent sealing outer lens or cover 23 (FIG. 6), and designed to be assembled to the latter in a sealed way.

Figure 2:
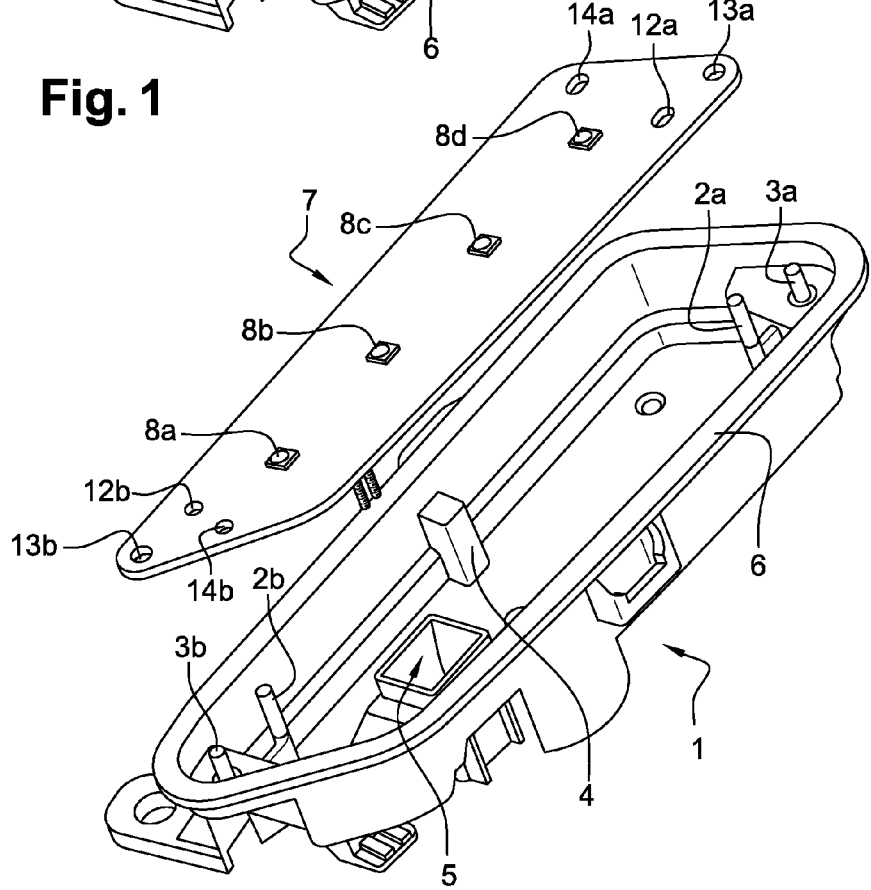
FIG. 2 shows schematically a perspective view of a housing and a printed circuit of a lighting or indicating device according to the invention, before assembly.

In FIG. 2, the preferred embodiment of a lighting or indicating device for a motor vehicle comprises the housing 1 and the printed circuit 7.

The printed circuit 7 may consist of a board, notably a printed electric circuit board, to which at least one light source is fastened.

A light source may comprise one or more light-emitting diodes soldered to the board or printed circuit 7, for example four light-emitting diodes 8a, 8b, 8c, 8d soldered to the board or printed circuit 7.

The printed circuit 7 comprises two means 12a, 12b for positioning the printed circuit 7 relative to the housing 1.

The two means 12a, 12b for positioning the printed circuit 7 relative to the housing 1 comprise, for example, two holes in the printed circuit 7 designed for positioning relative to the housing 1.

These two means 12a, 12b for positioning the printed circuit 7 relative to the housing 1 are, notably, designed to interact with the positioning means 2a, 2b comprising pins or studs extending from the bottom of the housing 1.

In the illustrated embodiment, this respective interaction of the positioning means 2a, 2b is provided by the penetration of the pins into the holes or two means 12a, 12b in the printed circuit 7.

The printed circuit 7 comprises two means 13a, 13b for the passage of the fastening means 3a, 3b comprising pins or studs extending from a support surface of the housing 1 intended to receive and support a lower face of the printed circuit 7.

These two passage means 13a, 13b of the printed circuit 7 comprise, for example, two holes in the printed circuit 7 designed for the passage of the fastening means 3a, 3b.

In the illustrated embodiment, this use of the positioning means 2a, 2b consists in the penetration of the pins or fastening means 3a, 3b and their passage through the holes or passage means 13a, 13b in the printed circuit 7.

The printed circuit 7 also comprises other means 14a, 14b for positioning the printed circuit 7 relative to an optical device.

These other means 14a, 14b for positioning the printed circuit 7 relative to an optical device comprise, for example, holes passing through the printed circuit 7.

These other means 14a, 14b for positioning the printed circuit 7 are designed to interact with the positioning means 2a, 2b provided on the optical device.

Figure 3:
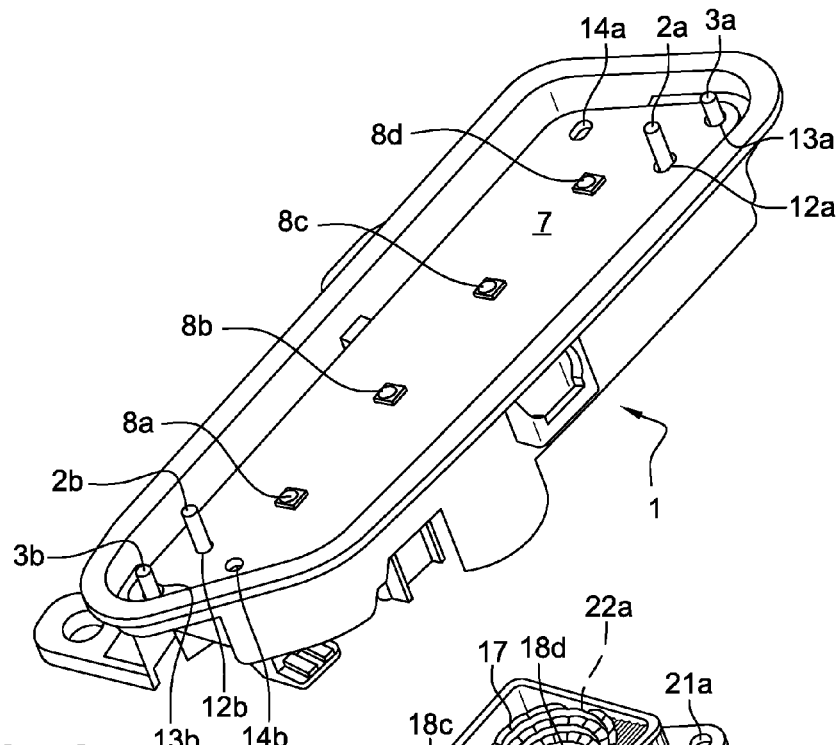
FIG. 3 shows schematically a perspective view of a housing and a printed circuit of a lighting or indicating device according to the invention, after assembly.

In FIG. 3, the preferred embodiment of a lighting or indicating device for a motor vehicle comprises the assembly of the housing 1 and the printed circuit 7, without the fastening or fixing of the housing 1 and the printed circuit 7 to one another.

The two means 12a, 12b for positioning the printed circuit 7 interact with the positioning means 2a, 2b comprising pins or studs extending from the bottom of the housing 1, by the penetration of the pins into the holes or two means 12a, 12b in the printed circuit 7.

The two passage means 13a, 13b of the printed circuit 7 interact with the fastening means 3a, 3b, by penetration of the pins or fastening means 3a, 3b and passage through the holes or two passage means 13a, 13b in the printed circuit 7.

The other means 14a, 14b for positioning the printed circuit 7 relative to an optical device comprise holes passing through the printed circuit 7.

These holes or means 14a, 14b passing through the printed circuit 7 are unobstructed and available for interaction with positioning means 2a, 2b provided on an optical device.

Figure 4:
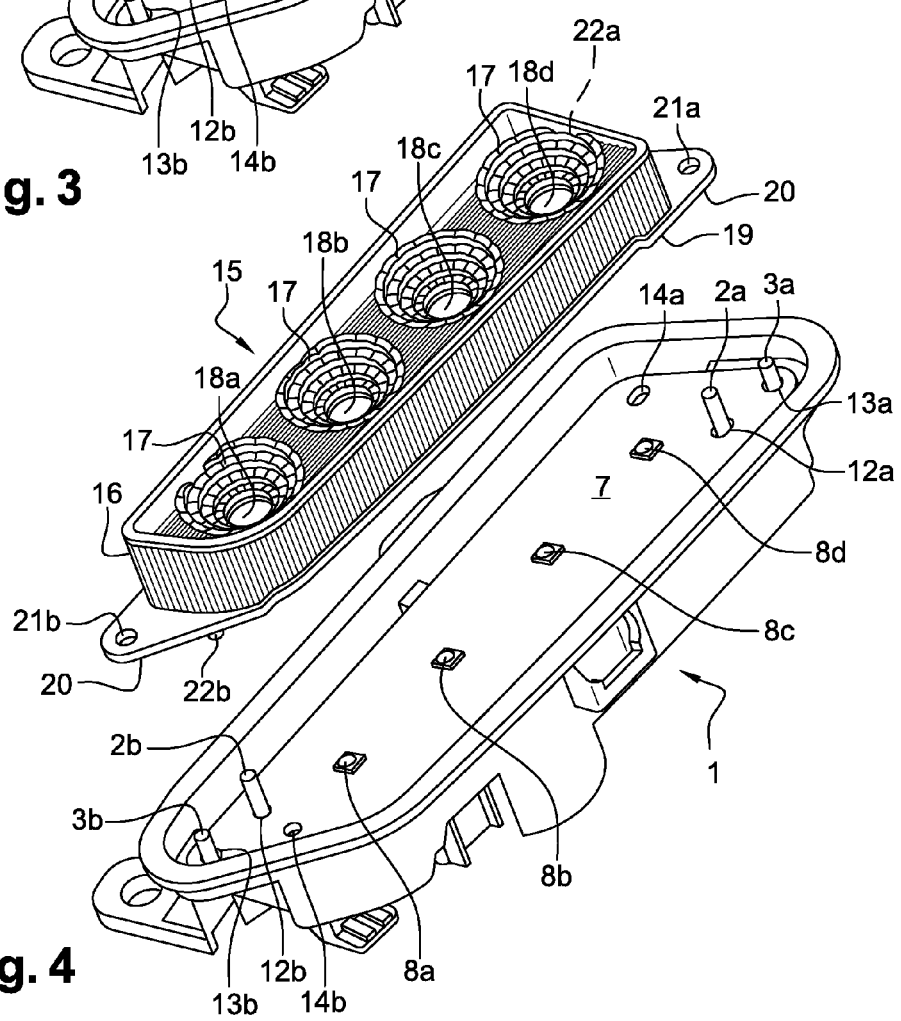
FIG. 4 shows schematically a perspective view of a housing and a printed circuit of a lighting or indicating device according to the invention and an optical device, before assembly.

In FIG. 4, the preferred embodiment of a lighting or indicating device for a motor vehicle comprises the assembly of the housing 1 and the printed circuit 7, without the fastening or fixing of the housing 1 and the printed circuit 7 to one another, and an optical device 15.

The optical device 15 is preferably made of plastic material by molding.

The optical device 15 preferably comprises a first relief structure 16 allowing light to pass through it, hollow shapes 17 being created in this structure to form an optical collimator. Alternatively, only the hollow shapes 17 allow light to pass through them, the rest of the first relief structure 16 being opaque.

At the bottom of the hollow shapes 17 forming the optical collimator, optical lenses 18a, 18b, 18c, 18d are formed, with four light-emitting diodes 8a, 8b, 8c, 8d arranged to face them, so that some of the light rays emitted by these luminous light-emitting diodes 8a, 8b, 8c, 8d pass through these lenses 18a, 18b, 18c, 18d.

The hollow shapes 17 forming the optical collimator constitute the optical device 15 properly so called.

The optical device 15 has a flat profile 19 and two lugs 20 for support on the upper face of the printed circuit 7.

The two lugs 20 for support on the upper face of the printed circuit 7 have two means 21a, 21b for the passage of the fastening means 3a, 3b comprising pins or studs extending from a support surface of the housing 1.

These two means 21a, 21b for the passage of the fastening means 3a, 3b comprise, for example, two holes for the passage of the fastening means 3a, 3b, designed for the passage of the fastening means 3a, 3b.

In the illustrated embodiment, this use of the two means 21a, 21b for the passage of the fastening means 3a, 3b consists in the penetration of the pins or fastening means 3a, 3b and the passage of the fastening means 3a, 3b through the holes or two means 21a, 21b.

The optical device 15 comprises means 22a, 22b for positioning the optical device relative to the printed circuit 7.

The two positioning means 14a, 14b of the printed circuit 7, comprising two holes, are designed to interact with the means 22a, 22b for positioning the optical device relative to the printed circuit 7.

The means 22a, 22b for positioning the optical device 15 relative to the printed circuit 7 comprise, for this purpose, pins or studs extending from the underside of the optical device 15.

In the illustrated embodiment, this respective interaction of the positioning means 22a, 22b is provided by the penetration of the pins into the holes or two positioning means 14a, 14b in the printed circuit 7.

The adjustment of these optical positioning means 22a, 22b is relatively precise: in order to ensure that the light sources 8a, 8b, 8c, 8d are correctly positioned relative to the hollow shapes 17, and that the light rays emitted by the light sources 8a, 8b, 8c, 8d are correctly directed after collimation by the hollow shapes 17, the clearance between the optical device 15 and the printed circuit 7 is typically less than 0.1 mm.

Figure 5:
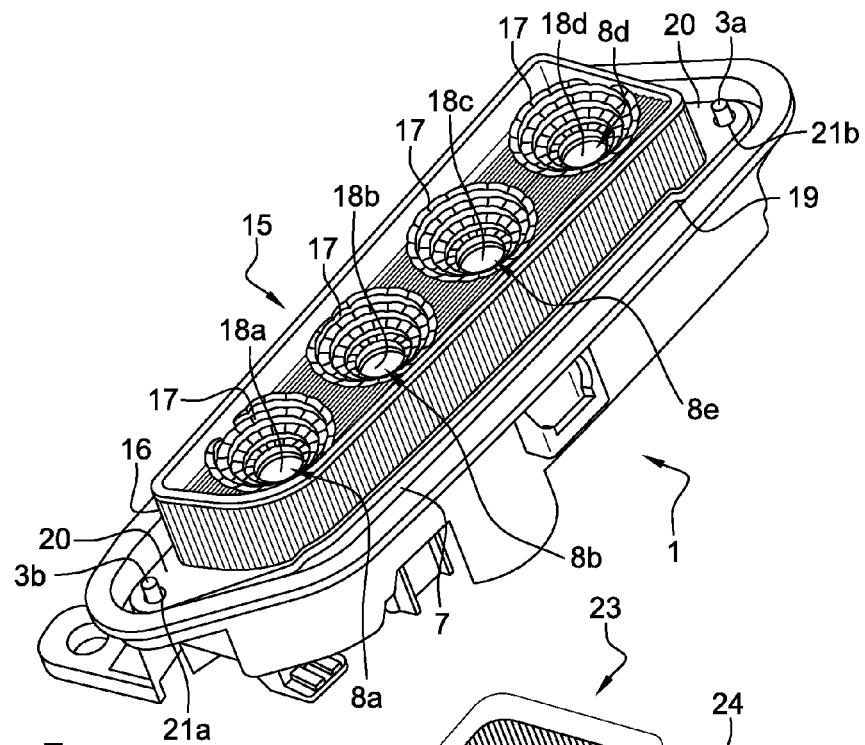
FIG. 5 shows schematically a perspective view of a housing and a printed circuit of a lighting or indicating device according to the invention and an optical device, after assembly.

In FIG. 5, the preferred embodiment of a lighting or indicating device for a motor vehicle comprises the assembly of the housing 1, the printed circuit 7, and the optical device 15.

The two positioning means 14a, 14b of the printed circuit 7, comprising two holes, are passed through by the means 22a, 22b for positioning the optical device 15 relative to the printed circuit 7.

The two means 22a, 22b for positioning the optical device 15 relative to the printed circuit 7 comprise, in this example, pins or studs extending from the underside of the optical device 15; however, the invention also extends to any other arrangement, notably the variant in which the two positioning means 14a, 14b of the printed circuit 7 comprise two pins passing through two holes forming part of the means 22a, 22b for positioning the optical device 15 relative to the printed circuit 7.

The rays closest to the global axis of emission of the four luminous light-emitting diodes 8a, 8b, 8c, 8d pass through the lenses 18a, 18b, 18c, 18d formed at the bottoms of the hollow shapes 17 forming the optical collimator.

The flat profile 19 and the two support lugs 20 of the optical device 15 are applied to the upper face of the printed circuit 7.

The two passage means 21a, 21b of the two lugs 20 for support on the upper face of the printed circuit 7 are passed through by the fastening means 3a, 3b comprising pins or studs extending from a support surface of the housing 1.

After the passage of the fastening means 3a, 3b through the passage holes or means 21a, 21b of the fastening means 3a, 3b, the assembly of the housing 1, the printed circuit 7, and the optical device 15 is finally fixed by deforming the projecting ends of the fastening means 3a, 3b extending from a support surface of the housing 1.

The operation of deforming the projecting ends of the fastening means 3a, 3b is preferably a hot riveting or swaging operation such that a mushroom head is formed.

This operation of deforming the projecting ends of the fastening means 3a, 3b by hot riveting or swaging thus makes it possible to fix together the stack formed by the housing 1, the printed circuit 7, and the optical device 15 after the successive positioning of the housing 1 and the printed circuit 7, then the printed circuit 7, and the optical device 15.

Figure 6:
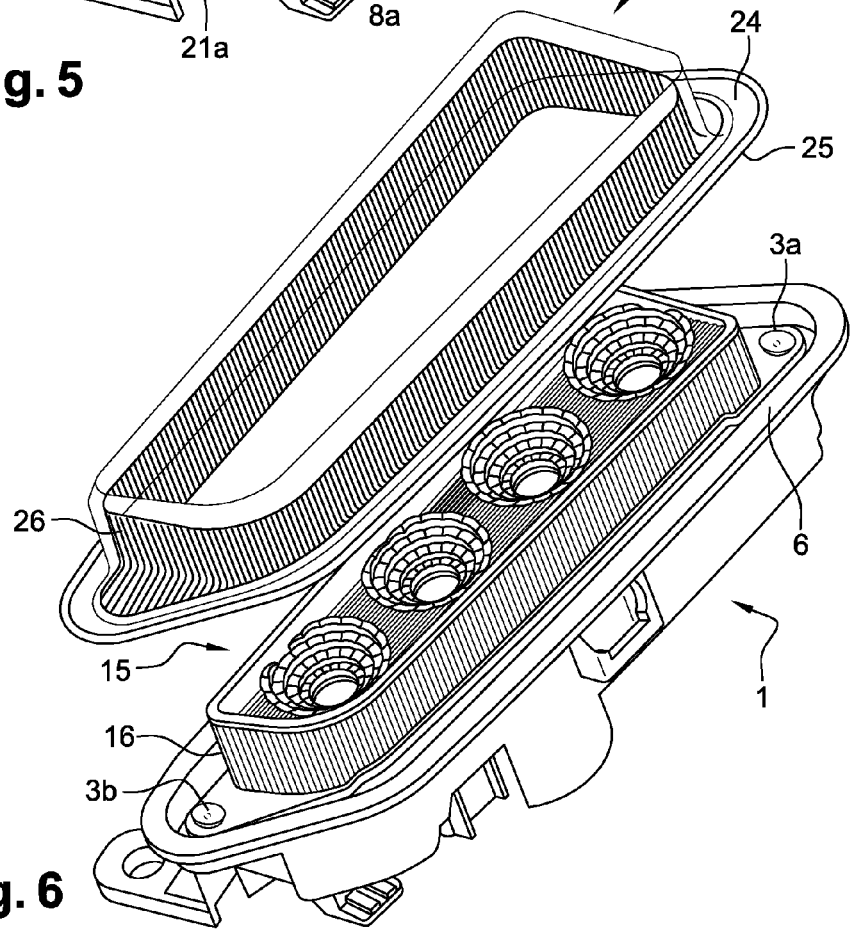
FIG. 6 shows schematically a perspective view of a housing and a printed circuit of a lighting or indicating device according to the invention and an optical device, assembled together, and an outer lens, before assembly.

In FIG. 6, the preferred embodiment of a lighting or indicating device for a motor vehicle comprises the final fixed assembly of the housing 1, the printed circuit 7, and the optical device 15, and a transparent or translucent outer lens or cover 23.

The transparent or translucent outer lens or cover 23 comprises a lower face 24 forming a flat region, bordered by a peripheral shoulder 25 forming a flange designed to fit on the centering means 6 forming a flat region of the housing 1.

The transparent or translucent outer lens or cover 23 preferably comprises a second relief structure 26 designed to fit on the first relief structure 16 of the optical device 15.

Figure 7:
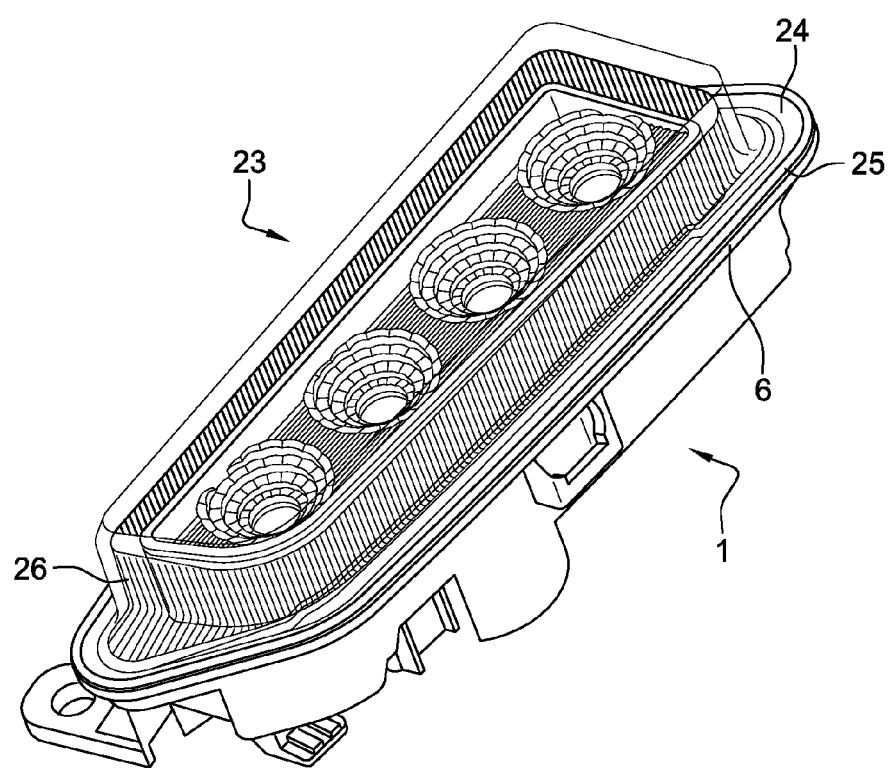
FIG. 7 shows schematically a perspective view of a housing and a printed circuit of a lighting or indicating device according to the invention and an optical device, assembled together, and an outer lens, after assembly.

In FIG. 7, the preferred embodiment of a lighting or indicating device for a motor vehicle comprises the assembly of the housing 1, the printed circuit 7, and the optical device 15, with the transparent or translucent outer lens or cover 23.

The transparent or translucent outer lens or cover 23 is applied by its lower face 24 forming a flat region onto the centering means 6 forming a flat region of the housing 1.

The transparent or translucent outer lens or cover 23 is centered on the housing 1 by means of the peripheral shoulder 25 forming a flange on the centering means 6 forming a flat region of the housing 1.

After the transparent or translucent outer lens or cover 23 has been applied by its lower face 24 forming a flat region onto the centering means 6 forming a flat region of the housing 1, and has been centered on the housing 1 by the peripheral shoulder 25 forming a flange on the centering means 6 forming a flat region of the housing 1, the two flat regions are fixed to one another, by ultrasonic welding for example.

The fixing of the two flat regions to one another, by ultrasonic welding for example, is preferably carried out in a sealed manner by forming a continuous peripheral weld bead.

Figure 8:
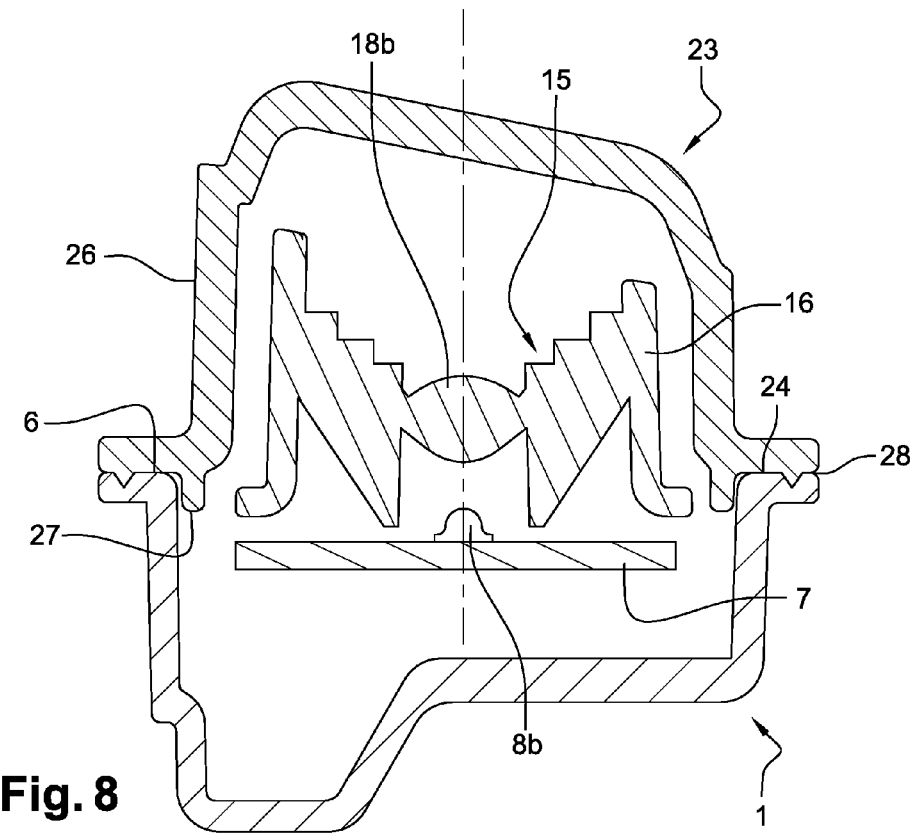
FIG. 8 shows schematically a cross-sectional view of a lighting or indicating device according to the invention.

In FIG. 8, the lighting or indicating device for a motor vehicle comprises the assembly of the housing 1, the printed circuit 7, and the optical device 15 with the transparent or translucent outer lens or cover 23.

The transparent or translucent outer lens or cover 23 is applied by its lower face 24 forming a flat region onto the centering means 6 forming a flat region of the housing 1.

The transparent or translucent outer lens or cover 23 is centered on the housing 1 by means of a peripheral shoulder 27 forming a flange on the centering means 6 forming a flat region of the housing 1.

In this example, the optical device 15 comprises the first opaque relief structure 16 in which hollow shapes 17 are created to form an optical collimator.

At the bottom of the hollow shapes 17 forming the optical collimator, optical lenses 18a, 18b, 18c, 18d are provided, facing four luminous light-emitting diodes 8a, 8b, 8c, 8d.

The hollow shapes 17 forming the optical collimator constitute the optical collimation device.

FIG. 8 also shows, in a chained line, the global axis of emission of the light-emitting diode 8b. The rays emitted by the light-emitting diode 8b lie within a cone having this global axis of emission as its axis. As can be seen here, the rays closest to this axis strike the optical lens 18b. The most distant rays enter the optical collimator through walls descending from the optical lens 18b toward the light-emitting diode 8b. They are then propagated in the optical collimator, so as to pass out of it through the periphery of the optical collimator. In this example, this periphery corresponds to the steps around the optical lens 18b. The surfaces of these steps may, as in this figure, have abrasive-blasted regions for increasing the diffusion of the rays leaving the optical collimator.

The transparent or translucent outer lens or cover 23 is advantageously fastened to the housing 1 by ultrasonic welding, preferably in a sealed manner by forming a continuous peripheral weld bead.

The housing 1 may also comprise, at the top of its edges, a channel 28 for receiving an adhesive product.

A peripheral ridge may be provided for this purpose on the transparent or translucent outer lens or cover 23. In this case, before the peripheral ridge is positioned in the channel 28, a bead of the adhesive product is placed at the bottom of the channel 28.

Figure 9:
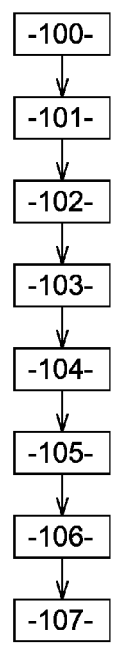
FIG. 9 shows schematically a flow diagram of a method for assembling, according to the invention, a housing, a printed circuit, an optical device, and an outer lens, to form a lighting or indicating device according to the invention.

In FIG. 9, an embodiment of a method for assembling a device according to the invention is described below with reference to steps 100 to 108.

This embodiment is applied, notably, to the production of a device according to the embodiment described with reference to FIGS. 1 to 8.

In a first step 100, the housing 1 is provided, comprising the first means 2a for positioning the printed circuit 7, the second means 2b for positioning the printed circuit 7, the first means 3a for fastening a stack formed by the printed circuit 7 and the optical device 15 to the housing 1, the second means 3b for fastening a stack formed by the printed circuit 7 and the optical device 15 to the housing 1, and the centering means 6 forming a flat region, notably designed to come into contact with the lower face 24 of the transparent or translucent sealing outer lens or cover 23, and designed to be assembled to the latter in a sealed manner.

In a second step 101, the printed circuit 7 is provided, this circuit possibly consisting of a board, notably a printed electric circuit board, to which at least one light source or light-emitting diode 8a, 8b, 8c, 8d is fastened.

The printed circuit 7 may carry one or more light-emitting diodes soldered to the board, for example four light-emitting diodes 8a, 8b, 8c, 8d soldered to the board or printed circuit 7. The printed circuit 7 comprises two means 12a, 12b for positioning the printed circuit 7 relative to the housing 1, which are, notably, designed to interact with the positioning means 2a, 2b comprising pins or studs extending from the bottom of the housing 1.

The printed circuit 7 comprises two means 13a, 13b for the passage of the fastening means 3a, 3b comprising pins or studs extending from a support surface of the housing 1 intended to receive and support a lower face of the printed circuit 7.

The printed circuit 7 comprises other means 14a, 14b for positioning the printed circuit 7 relative to an optical device 15.

In a third step 102, the printed circuit 7 is put into place or positioned in the housing 1. This placing or positioning is carried out by the interaction of the corresponding positioning means 14a, 14b.

In this third step 102, the printed circuit 7 is not fastened in the housing 1. The printed circuit 7 is retained purely by gravity in the housing 1. If the housing 1 is turned over, the printed circuit 7 escapes from the housing 1.

In a fourth step 103, the optical device 15 is provided with hollow shapes 17 forming a collimator or optical reflector, means 21a, 21b for the passage of the fastening means 3a, 3b of the housing 1, and means 22a, 22b for positioning the optical device 15 relative to the printed circuit 7.

In a fifth step 104, the optical device 15 is put into place or positioned on the printed circuit 7. This placing and positioning is carried out by the interaction of their respective positioning means described above: for this purpose, the two positioning means 14a, 14b of the printed circuit 7, comprising two holes, are passed through by the means 22a, 22b for positioning the optical device 15 relative to the printed circuit 7.

The flat profile 19 and the two support lugs 20 of the optical device 15 are applied to the upper face of the printed circuit 7. The two passage means 21a, 21b of the two lugs 20 for support on the upper face of the printed circuit 7 are passed through by the fastening means 3a, 3b comprising pins or studs extending from a support surface of the housing 1.

After the passage of the fastening means 3a, 3b through the passage holes or two passage means 21a, 21b of the fastening means 3a, 3b, the assembly of the housing 1, the printed circuit 7, and the optical device 15 is finally fixed by deforming the projecting ends of the fastening means 3a, 3b extending from a support surface of the housing 1.

The operation of deforming the projecting ends of the fastening means 3a, 3b is preferably a hot riveting or swaging operation such that a mushroom head is formed.

This operation of deforming the projecting ends of the fastening means 3a, 3b by hot riveting or swaging thus makes it possible to fix together the stack formed by the housing 1, the printed circuit 7, and the optical device 15 after the successive positioning of the housing 1 and the printed circuit 7, then the printed circuit 7, and the optical device 15.

In a sixth step 105, the transparent or translucent outer lens or cover 23 is provided.

The transparent or translucent outer lens or cover 23 may comprise the lower face 24 forming a flat region, and the shoulder 25 or 27 forming a flange designed to interact with the centering means 6 forming a flat region of the housing 1.

The transparent or translucent outer lens or cover 23 may comprise the second relief structure 26 designed to fit on the first relief structure 16 of the optical device 15.

In a seventh step 106, the transparent or translucent outer lens or cover 23 is fastened to the housing 1. The transparent or translucent outer lens or cover 23 is applied by its lower face 24 forming a flat region onto the centering means 6 forming a flat region of the housing 1.

The transparent or translucent outer lens or cover 23 is centered on the housing 1 by means of the shoulder 25 or 27 forming a flange on the centering means 6 forming a flat region of the housing 1.

After the transparent or translucent outer lens or cover 23 has been applied by its lower face 24 forming a flat region onto the centering means 6 forming a flat region of the housing 1, and has been centered on the housing 1 by the shoulder 25 or 27 forming a flange on the centering means 6 forming a flat region of the housing 1, the two flat regions are fixed to one another, by ultrasonic welding for example.

The fixing of the two flat regions to one another, by ultrasonic welding for example, is preferably carried out in a sealed manner by forming a continuous peripheral weld bead.

According to another variant, a bead of glue is placed in a channel 28 formed in the housing 1. In this step of fastening the transparent or translucent outer lens or cover 23 to the housing 1, the support means of the transparent or translucent outer lens or cover 23 is made to surround the optical device 15 without pressing on its upper face.

In all the variants of the invention, the printed circuit 7 and the optical device 15 assembled by stacking to the housing 1 are not subjected to any pressure stress due to the transparent or translucent outer lens or cover 23.

In an eighth step 107, the assembled device according to the invention can be electrically connected to a control means of a motor vehicle for which the device according to the invention is intended.

For this purpose, the means 5 for mounting a connector or electrical interface of the housing 1 is used to electrically connect the conductors or pins of the printed circuit 7 to a control means of a motor vehicle for which the device according to the invention is intended.

The invention described with reference to particular embodiments is not in any way limited thereby, but covers any change of form and any variant embodiment within the context of the attached claims.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A lighting or indicating device for a motor vehicle, comprising an enclosure formed by a housing and an outer lens or cover, said enclosure receiving a printed circuit carrying at least one light source and an optical device, wherein said housing comprises fastening means extending from said housing for fastening a stack formed by said printed circuit carrying said at least one light source and said optical device, so as to fix together said housing, said printed circuit carrying said at least one light source and said optical device, said printed circuit carrying said at least one light source being sandwiched between said housing and said optical device;

wherein said fastening means are adapted to pass through a passage means of said printed circuit and then through a second passage means of said optical device, each of said fastening means has a projecting end extending beyond said optical device, said projecting ends having a deformation for fastening said stack formed by said printed circuit and said optical device to said housing.

2. The lighting or indicating device as claimed in claim 1, wherein said housing comprises means for positioning said printed circuit, and in that said printed circuit comprises means for positioning said optical device.

3. The lighting or indicating device as claimed in claim 2, wherein said housing comprises a centering means forming a flat region, coming into contact with a lower face of said outer lens or cover, and surrounding said printed circuit and said optical device assembled to said housing by stacking.

4. The lighting or indicating device as claimed in claim 1, wherein said housing comprises a centering means forming a flat region, coming into contact with a lower face of said outer lens or cover, and surrounding said printed circuit and said optical device assembled to said housing by stacking.

5. The lighting or indicating device as claimed in claim 4, wherein said housing and said outer lens or cover are fastened to one another without screws and in a sealed manner by a continuous assembly bead connecting two regions, while preventing said printed circuit and said optical device from being subjected to a pressure stress caused by said outer lens or cover.

6. The lighting or indicating device as claimed in claim 1, wherein said deformation of said projecting ends of said fastening means for fastening said stack formed by said printed circuit and said optical device to said housing comprises a hot riveting or swaging operation to form a mushroom head.

7. The lighting or indicating device as claimed in claim 1, wherein at least one of said passage means or said second passage means are holes.

8. The lighting or indicating device as claimed in claim 1, wherein said means for fastening a stack formed by said printed circuit carrying said at least one light source and said optical device to said housing comprise pins or studs extending from a support surface of said housing receiving and supporting a lower face of said printed circuit.

9. The lighting or indicating device as claimed in claim 1, wherein said at least one light source comprises at least one light-emitting diode.

10. A method for assembling a lighting or indicating device for a motor vehicle, comprising an enclosure formed by a housing and an outer lens according to claim 1, comprising the following steps:

a first step of providing said housing;
    a second step of providing said printed circuit;
    a third step of placing and positioning said printed circuit in said housing without fastening said printed circuit in said housing;
    a fourth step of providing said optical device; and
    a fifth step of placing and positioning said optical device on said printed circuit;
    wherein said fifth step comprises an operation of finally fixing an assembly of said housing, said printed circuit, and said optical device, with said printed circuit carrying said at least one light source sandwiched between said housing and said optical device.

11. The method for assembling a lighting or indicating device as claimed in claim 10, wherein said operation of finally fixing said assembly of said housing, said printed circuit, and said optical device comprises said deformations of said projecting ends, respectively, of said fastening means extending from a support surface of said housing.

12. The method for assembling a lighting or indicating device as claimed in claim 10, wherein said method comprises a step of assembling said outer lens or cover to said housing, executed without a transmission of stress or deformation to said printed circuit or to said optical device.

13. The method for assembling a lighting or indicating device as claimed in claim 10, wherein said at least one light source comprises at least one light-emitting diode.

\* \* \* \* \*